United States Patent

[11] 3,588,466

| | | | |
|---|---|---|---|
| [72] | Inventor | Evans H. Daggett |
| | | Murray Hill, N.J. |
| [21] | Appl. No. | 791,669 |
| [22] | Filed | Jan. 16, 1969 |
| [45] | Patented | June 28, 1971 |
| [73] | Assignee | Air Reduction Company Incorporated |
| | | New York, N.Y. |

[54] PULSED POWER WELDING SYSTEM WITH SUPPRESSED PULSE START
16 Claims, 8 Drawing Figs.

[52] U.S. Cl........................................ 219/137,
219/130, 219/131, 219/135
[51] Int. Cl...................................... B23k 9/00
[50] Field of Search............................ 219/130,
131, 137, 135

[56] References Cited
UNITED STATES PATENTS
3,459,920  8/1969  Sevenco ....................... 219/137X Primary Examiner—J. V. Truhe
Assistant Examiner—C. L. Albritton
Attorneys—Larry R. Cassett, Edmund W. Bopp and H. Hume Mathews ABSTRACT: A pulsed power arc welding system having background power means for maintaining a stable arc combined with complementary pulsing power means including silicon controlled rectifier circuitry for controlling flow of individual current pulses to the arc for pulsed spray arc welding, the pulsing power being excessive for initial arc starting on short circuit, a sensor for detecting background starting current, and time-delay means responsive to the sensor for applying only after predetermined delay triggering bias in one or more stages to the rectifier circuitry for starting the pulsing current.

INVENTOR
EVANS H. DAGGETT
BY Larry R. Cassett
ATTORNEY

INVENTOR
EVANS H. DAGGETT
BY Larry R. Cassett
ATTORNEY

INVENTOR
EVANS H. DAGGETT
BY
ATTORNEY

PULSED POWER WELDING SYSTEM WITH SUPPRESSED PULSE START

BACKGROUND OF THE INVENTION

This invention relates to pulsed power electric arc welding systems using a so-called "pulsed-spray" method for depositing the weld metal. A welding system of this character is disclosed and claimed in U.S. Pat. No. 3,071,680, granted Jan. 1, 1963 to Anderson et al. for "Arc Welding."

In the pulsed-spray welding method, at least two different levels of power are combined in a complementary sense for achieving the desired spray-type deposit of weld metal. One level of power is used for maintaining a heat sustaining or so-called "background arc," and another and higher level of power is periodically used in pulselike manner for spray deposition of the weld metal. A commercial application of this method is described in "Welding Journal" for Apr. 1966, pages 284 to 289; essentially, background power provides unidirectional current at sufficient level for sustaining a stable arc between the welding electrode and work, while complementary pulsing power provides periodically individual current pulses having peak values above the background level and sufficiently high for achieving pulsed-spray deposition of the weld metal.

The present invention is concerned with improved control of the pulsing power supply for facilitating arc starting.

In certain applications of pulsed power welding, starting problems have been encountered involving excessive short circuit current with very high rate of current buildup at the instant of electrode-work contact. The high short circuit pulse current tends to explode the wire electrode and cause spattering of metal, with attendant possibility of arcing in the electrode contact tube; this in turn, can interfere with normal feed of the wire electrode, and result in "burnback," i.e., burning-off of the electrode extension up to the contact tube.

The cause of such poor starts appears to be due to random contact between electrode and work with respect to the instant magnitude of the corresponding voltage pulse before the lower background arc current is established. If such contact is made at the instant when the pulse voltage has reached or is closely approaching its peak value, there is insufficient time for the comparatively cold workpiece to absorb the high I²R heat energy input so that this energy is largely concentrated in the wire electrode extension. As a result, the electrode tends to explode or "blow" as a fuse, and a poor start as described above occurs. Furthermore, the starting problem can be aggravated by high feed rates of the wire electrode now practiced, for example 200 inches per minute, that often result in successive rapid explosions and extensive splatter as renewed electrode extensions feed from the contact-guide tube to the comparatively cold work. THat is, for a practical pulse rate of 60 p.p.s., it will be seen that several high current surges may occur before the background current becomes effective to start the arc and form a weld puddle.

In the face of these difficulties, several starts may be required before a stable arc can be established and normal welding continued; furthermore, such poor starts tend to affect adversely both the quality and appearance of the initial weld.

Although auxiliary arc starting methods have been proposed for initial formation of a welding arc, such as for example using a separate low-voltage circuit for initiating the arc on short circuit with subsequent transfer of arc control to the main welding arc circuitry, prior methods as presently known are not applicable to the special timing requirements of pulsed power arc starting here in question.

SUMMARY OF INVENTION

In accordance with the invention, the normal pulsing power is suppressed by delaying its application to the arc circuit until the background arc current is established, following initial contact between electrode and work. After a predetermined time period or delay, depending on factors such as background power, work thickness, and electrode size, material and feed rate, the normal pulsing power is applied for establishing the steady-state pulsed-spray arc. In particular, the time period is set into time-delay means that in turn is responsive to sensing means for detecting a manifestation of the initial arc, i.e. the background current at start of background arcing. By this method of pulse control, the abortive explosivelike starts described above, are avoided with resulting improved quality and appearance of the initial weld.

A principal object of the invention therefore is to provide an improved method of arc starting for pulsed power welding systems wherein explosive and abortive starts are avoided.

A related object is to provide an improved starting control system wherein normal pulse current is suppressed initially and during a period representing establishment of a stable background arc.

Another related object is to provide integrated electronic circuitry for the pulsed power supply wherein controlled rectifier means for producing the current pulses is also controlled for suppressing normal pulse current until after background arc starting.

Other objects, features and advantages will appear from the following description with reference to the accompanying drawings.

DESCRIPTION OF THE PREFERRED EMBODIMENTS

Figure 1:
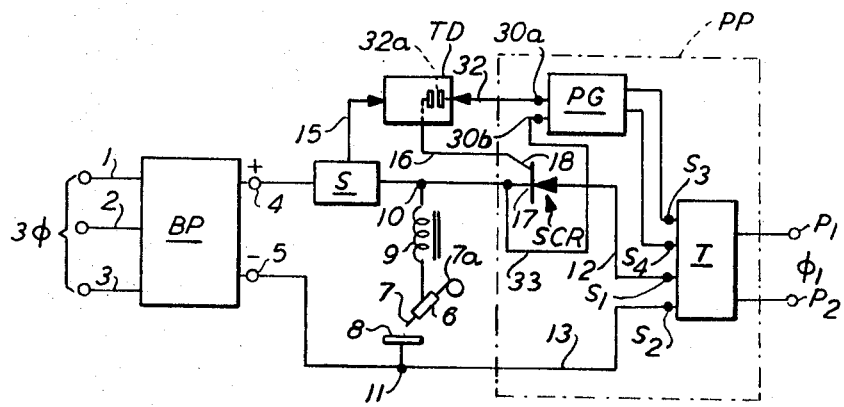
FIG. 1 is a flow-type system diagram illustrating the basic concept of the invention as applied to a known system of pulsed power arc welding.

Referring first to FIG. 1, the flow diagram represents a pulsed power arc welding system of the character outlined above. A background power supply generally indicated by BP is connected at its input terminals 1, 2 and 3 to a three-phase, 60-c.p.s. power source for example, from which is derived through conventional transformer and full-wave rectifier circuitry, a substantially constant DC voltage at the output terminals 4 and 5. The DC voltage is selected according to design characteristics of the welding circuitry and produces background current for the arc circuit. This circuit, which is also connected to a supply of pulsing power indicated essentially at PP, includes in series the electrode contact tube 6, arc welding electrode 7 with wire feed generally indicated at 7a, workpiece 8 and choke coil 9; the background circuit also includes a DC sensor S for a purpose described later. The choke coil 9 has a commutation function for ensuring smooth transition between the background current and complementary pulsing currents flowing in the common arcing circuit between junctions 10 and 11, and is fully described in U.S. Pat. No. 3,365,564, granted Jan. 23, 1968 to P. Boughton for "Electric Arc Welding."

The pulsing current delivered to the junctions 10 and 11 across the arc is derived from the pulsing power ply PP, that includes a supply transformer T, the primary winding of which may be connected to a single-phase, 60-c.p.s. power source, $\Phi_1$, for example. This single-phase supply may of course, constitute one of the phases of the three-phase power source, above. The secondary winding is tapped, FIGS. 1 and 2, for suitable arcing voltage takeoff at output terminals $s_1$ and $s_2$ that, in turn, are connected to the arcing circuit junctions 10 and 11 through suitable switching means, preferably a controlled rectifier such as a silicon controlled rectifier SCR. The rectifier is controlled by a pulse generator PG described below in connection with FIG. 2, for passing rectified half-wave or pulse current to the welding arc at 7—8, the pulse current having a higher peak value than the background current for achieving pulsed-spray welding as explained in U.S. Pat. No. 3,071,680.

Figure 6:
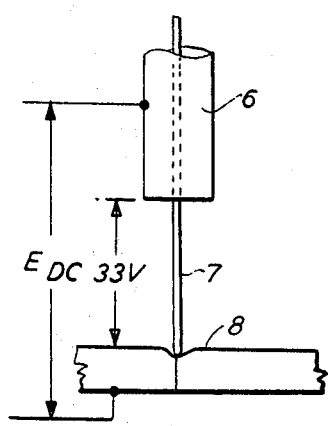
FIG. 6 is a partial view of welding electrode structure and work indicating pulse peak voltage initially impressed across a small diameter wire electrode.
Figure 7:
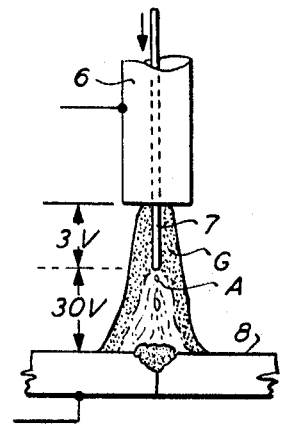
FIG. 7 shows a normal voltage distribution during pulsed-spray arc welding using the electrode of FIG. 6.

Summarizing briefly the normal operation of the arc welding system so far described, the background current is maintained at a level sufficient for sustaining a stable arc, but below the "transition" current above which so-called spray deposition of weld metal occurs. The pulse currents rise above the transition level for producing the pulsed-spray effect, and are so time-spaced as to preclude deposition of globular weld metal by background current in the interval between pulses. The peak or maximum value of the pulsing current is primarily dependent on the diameter and material of the electrode; where a wire electrode of a low resistance, low melting point metal such as aluminum is used, the starting problem described above is more acute. This is readily seen by reference to FIGS. 6 and 7 that illustrate in general manner the voltages impressed across the wire electrode extension at initial contact start and during normal pulsed-spray arc welding, respectively. In FIG. 6, it is assumed that a DC pulse potential of 33 volts is available between the electrode contact tube 6 and the work 8 at the instant the electrode 7 contacts the work. This potential, now practically wholly impressed across the wire electrode, causes an instantaneous high surge of pulse current in the wire with large $I^2R$ valve of heat energy. As there is not enough time for heat dissipation to the comparatively cold work at 8, the wire 7 "blows" in the manner of a fuse, spattering the wire metal in all directions and preventing establishment of a stable arc. As the wire continues to feed rapidly through the tube 6, successive "blowings" may occur each time the wire touches the work. By contrast, FIG. 7 indicates the comparatively low potential across the electrode extension 7 when a stable arc A, shown as having a protective gas shield G, exists in the same circuit. Here, the voltage drop across the extension is but 3 volts, the remaining 30 bolts constituting the arc voltage drop that includes the anode, cathode and plasma IR drops for maintaining a stable pulse-spray welding arc. It is therefore apparent that, given simultaneous conditions of pulse peak voltage and initial contact between electrode and work, explosive and abortive starts tend to occur in the absence of stable arc voltage distribution.

For avoiding such abortive starts and thereby improving the quality of the initial weld, the normal pulse current at start is suppressed either in whole or in part, and subsequently is switched on after a predetermined time period, or in graduated stages as preferred, giving the background current sufficient time to establish the initial arc following the short circuit contact. This initial period for establishing the background arc may range from about 0.05 to 1.0 second, depending mainly on the heat absorbing characteristics of the work, i.e., work thickness and material.

Figure 2:
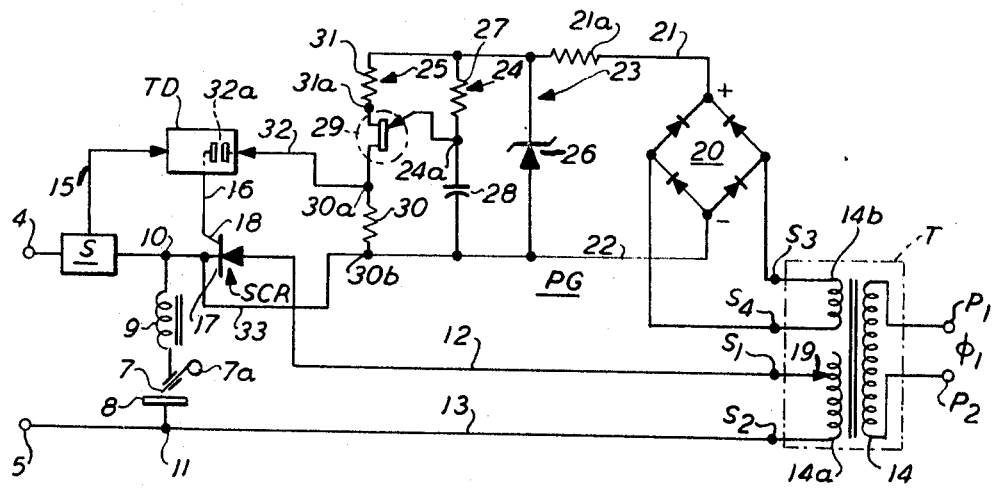
FIG. 2 is a more detailed diagram of pulsed power control circuitry indicated generally in FIG. 1.

For achieving such pulse suppression, referring now to FIG. 2, the background arc current (i.e. background arc) sensor S, which may in the example indicated, comprise a simple DC ammeter shunt-type device connected in series in the background circuit, is adjusted for detecting DC background current when it reaches arcing level. This takes place practically instantaneously, following short circuit contact of the electrodes. At this level, the sensor output signal on conductor 15 activates a preset conventional timing device TD that starts measuring or counting-off the preselected time delay period. By the end of this period, a stable background arc has formed and the device TD switches at contacts 32a a biasing or triggering signal from the pulse generator circuitry PG, terminals 30a and 30b, and through conductor 16 to the gate 18 of SCR. The biasing gate signal operates in well-known manner to trigger the SCR for low resistance to unidirectional current flow through the SCR. Accordingly the now unsuppressed rectified half-wave of pulse current flows normally through the established arcing circuit including the transformer output terminal $s_1$, line 12, SCR, junction 10, choke 9, arc at 7—8, junction 11 and line 13 to the opposite transformer terminal $s_2$.

The means for deriving the pulse current and pulse control signals may consist of known electronic circuitry and the arrangements shown in FIG. 2 are by way of example. At the source, the single phase transformer T comprises a primary winding 14, the input terminals, $P_1$ and $P_2$ of which are energized from a single phase source $\Phi_1$. The secondary winding is in two sections 14a and 14b, the former supplying pulsing power and having the output terminals $s_1$ and $s_2$ connected to the pulsed-arcing circuit as described above. The terminal $S_1$ is connected to the secondary through a voltage adjusting slider 19. The section 14b provides for pulse synchronization and is shown connected through its output terminals $s_3$ and $s_4$ to standard rectifier SCR control means. The example shown is illustrated in "SCR Manual," page 79, 4th Edition, 1967 by General Electric Company and will be described briefly. The synchronizing transformer output at 14b energizes a full-wave rectifier unfiltered loop 20, the output terminals of which are connected to opposite polarity lines 21 and 22 respectively. For pulse shaping and timing, three branch circuits—23, 24, and 25—are connected in parallel across the lines, branch 23 having a Zener diode 26 that is related to a resistor 21a for squaring the full-wave rectified pulse peaks, branch 24 including a resistance 27 and capacitor 28 selected for an RC time-constant characteristic, and branch 25 including a unijunction transistor 29 having a switching characteristic, in series with impedances 30 and 31. The circuitry described above functions by squaring off the peaks of the train of full-wave rectified pulses, phase shifting the current pulses, and, at branch 25, "firing" the unijunction transistor 29 for producing the desired SCR biasing signal, or triggering voltage, across the impedance 30 at terminals 30a and 30b. Firing occurs when the potential between the RC junction 24a and the terminal 30a exceeds a certain ratio, such as 65 percent, of the potential across the transistor, i.e. between the terminals 30a and 31a. THe rate of build up of potential at junction 24a depends on the selected time constant of the RC branch and determines the timing of the transistor firing and, therefore, the triggering time of SCR with reference to the starting point in the voltage cycle.

The PG output signal taken from the terminals off the impedance 30 consists of a voltage pulse that is timed as described above, with respect to the AC supply source for controlling SCR switching. Specifically, the signal terminal 30a is connected through line 32, contacts 32a of the time delay device TD, and line 16 to the SCR gate 18, and signal terminal 30b is connected by line 33 to the SCR cathode 17. The time delay device therefore blocks application of the SCR biasing signal so that SCR remains nonconducting until the end of the predetermined pulse suppression period. The device TD may assume any preferred form, including well-known mechanical and electrical types, operable in response to the DC background sensor signal for starting the timing run. In a practical arrangement wherein a sensor signal of but a few milliamperes is obtained, a high-speed relay is energized by this signal through a solid-state amplifier for starting a conventional short period timer. At the end of the period, the timer closes contacts 32a.

Figure 3:
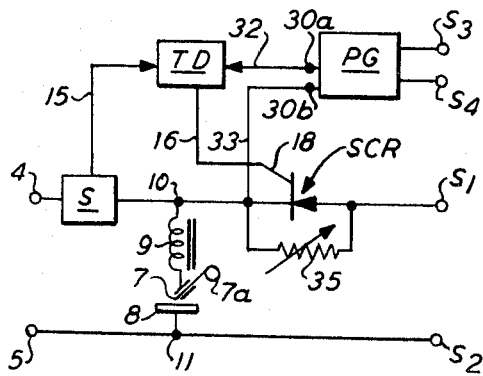
FIG. 3 is a diagram based on FIG. 1 illustrating a modified form of the pulse current suppression.

A modified method of initially suppressing the normal pulse current is shown by FIG. 3. Here, the basic circuitry is the same as in FIGS. 1 and 2 except that SCR is shunted by an impedance such as a resistance 35 selected (or variable if preferred) for suppressing or blocking off normal current from the pulse power supply until actual triggering of SCR. The low resistance of the triggered SCR during normal operation effectively shunts out the impedance. Prior to the triggering of SCR, the impedance 35 reduces the normal pulse current to a valve that is in general, although not necessarily, below the transition value.

Figure 4:
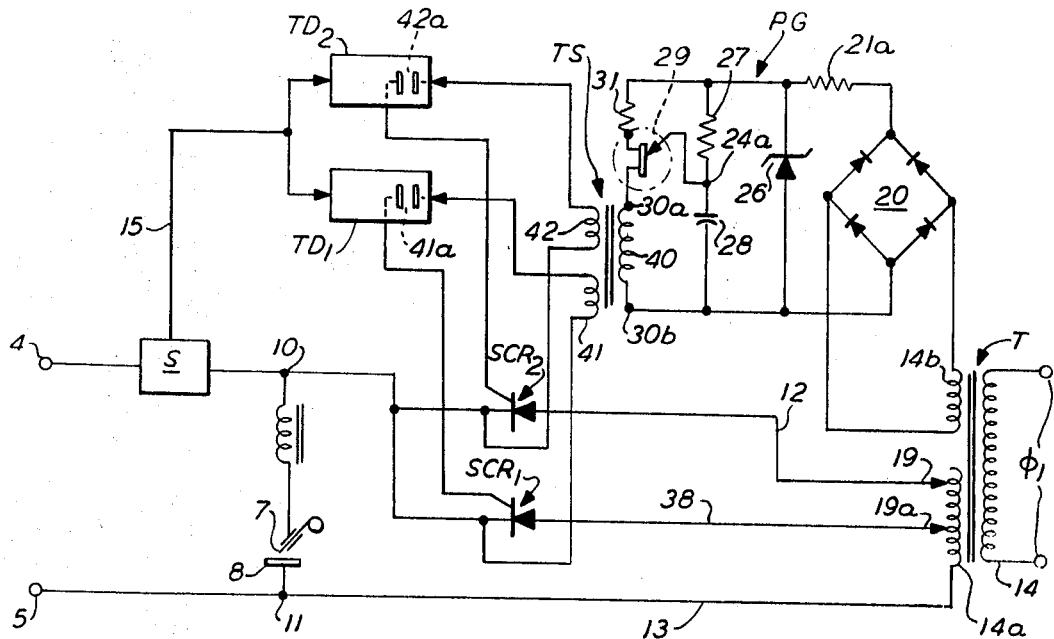
FIG. 4 is a diagram also based on FIG. 1, illustrating another form of the invention for multiple-stage pulse current suppression.

The time delay feature of FIGS. 1 and 2 can be elaborated where preferred by a graduated two-stage suppression of the pulse current as shown in FIG. 4. In this arrangement, two sources of pulse voltage at different levels are applied in sequence to the pulsing arc circuitry by separate time delay devices $TD_1$ aNd $TD_2$, respectively. The section 14a of the pulsing power transformer secondary is in this cast tapped at two points, namely, at 19 for the normal operating pulse voltage applied through $SCR_2$ to junction 10 as in FIG. 2, and at 19a for a comparatively low pulse-start voltage that is somewhat earlier applied through a parallel line 38 including $SCR_1$ that is connected also to junction 10 of the arcing circuit. The time delay devices $TD_1$ and $TD_2$ control application of the triggering signal from the control impedance to $SCR_1$ and $SCR_2$ in generally the same manner as in FIG. 2, except that separate signal circuits for each SCR are used for electrical isolation. In this instance, the signal impedance across the pulse generator terminals 30a and 30b is the primary winding 40 of a signal transformer Ts. The secondary has two isolated winding 41 and 42 for separately transmitting the induced triggering signals through the contacts 41a and 42a of $TD_1$ and $TD_2$ respectively, to $SCR_1$ and $SCR_2$ as described above.

Initially, upon sensor signalling, both $TD_1$ and $TD_2$ which are set for different delay periods, are simultaneously started and begin their respective time counts. After an initial short delay, $TD_1$ triggers $SCR_1$ for applying a selected prestart pulsing voltage to the arcing circuit that is sufficiently low to avoid "blowing" "of the electrode extension, yet high enough to assist in arc starting. Subsequently, at termination of the longer selected time delay at $TD_2$ the normal pulsing current is switched on by $SCR_2$ as described above. This method of starting is helpful where a wire electrode of low resistance and low melting point such as aluminum, is used.

Figure 5:
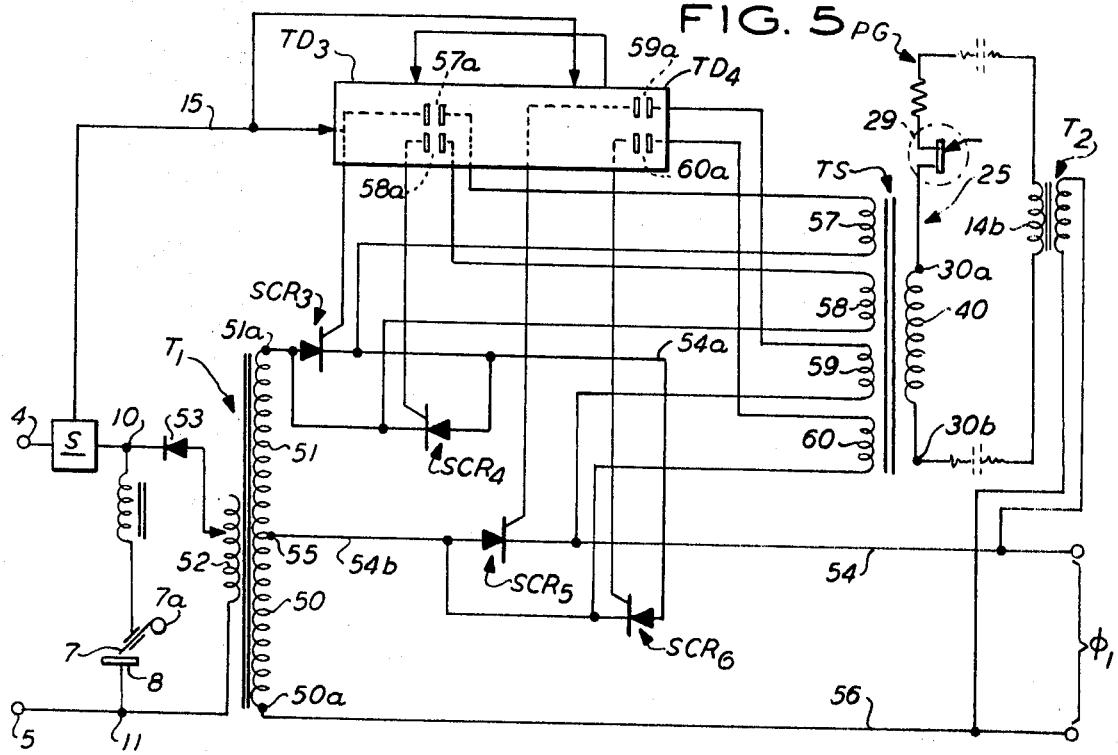
FIG. 5 is a partly schematic illustration time delay circuitry generally indicated in FIG. 5.

FIG. 5 illustrates a modification of the two-stage method of FIG. 4, wherein SCR control is used in primary network of the power supply transformer $T_1$, rather than in the secondary, for applying during the first stage a higher than normal stepdown transformer ratio, with corresponding lower pulse voltage in the secondary. In the second stage, the transformer ratio is reduced for obtaining normal pulse voltage in the secondary. By this method of primary control high voltage, low current SCRs can be used to practical advantage.

The circuitry of FIG. 5 illustrates one example of such primary circuit control. A pair of timers $TD_3$ and $TD_4$ having in comparative sense, short and long delay periods respectively, are simultaneously started by the background sensing signal from line 15. Each timer at the end of its delay period applies triggering or gating signals from the pulse generator to a related pair of controlled rectifiers, i.e. $SCR_3$, $SCR_4$ or $SCR_5$, $SCR_6$ as the case may be, in the primary network for determining the transformer voltage ratio, and hence the secondary or pulse voltage. The SCR gating control in FIG. 5 is essentially the same as in FIG. 4, except that the signal transformer $T_s$ has four electrically isolated secondary windings, namely, two pairs 57, 58 and 59, 60 that connect respectively through the contacts 57a, 58a and 59a, 60a of the timers $TD_3$ and $TD_4$ for triggering a corresponding pair of the rectifiers $SCR_3$, $SCR_4$ and $SCR_5$, $SCR_6$.

The primary winding of supply transformer $T_1$ is composed of two series-related sections 50 and 51, with a junction terminal at 55. The secondary winding 52 is connected through a diode 53 that provides a DC supply for the arc circuit, as shown. When the transformer primary sections 50 and 51 are connected in series (through $SCR_3$ and $SCR_4$) across the single phase AC supply lines 54 and 56, the transformer has a comparatively high stepdown ratio with correspondingly low secondary pulse voltage; accordingly, this connection is used for the first stage time delay. The lower ratio primary connection for normal secondary pulse voltage is obtained by using section 50 alone, for the primary winding. In this instance, the supply line 54 is connected through $SCR_5$, $SCR_6$ and line 54b to the junction terminal 55 of section 50, the opposite terminal at 50a being connected to the other line 56. At the end of the second delay period when $SCR_5$ and $SCR_6$ are triggered through $TD_4$, and section 50 starts to function as the primary winding, the upper section 51 is cut out by removing the triggering signals for $SCR_3$, $SCR_4$.

In operation, the timer $TD_3$ set for the short period, passes after the initial delay triggering signals for $SCR_3$ and $SCR_4$. These controlled rectifiers are connected for passing full-wave AC from the source 54, 56 through the combined primary winding 51, 50. The series-connected primary sections 51, 50 thus constitute the primary of transformer $T_1$ for high stepdown voltage ratio and low secondary pulse voltage. During the second stage time delay when $SCR_3$ and $SCR_4$ are still conducting, $TD_4$ (set for the longer and final delay period) blocks application of triggering signals to $SCR_5$, $SCR_6$ that are in a branch connection between the supply line 54 and the section junction 55. This branch therefore remains nonconducting until triggering of $SCR_5$, $SCR_6$ at the end of the $TD_4$ delay period, at which time section 50 is connected through junction 55 and branch line 54b to the supply line 54.

Figure 5A:
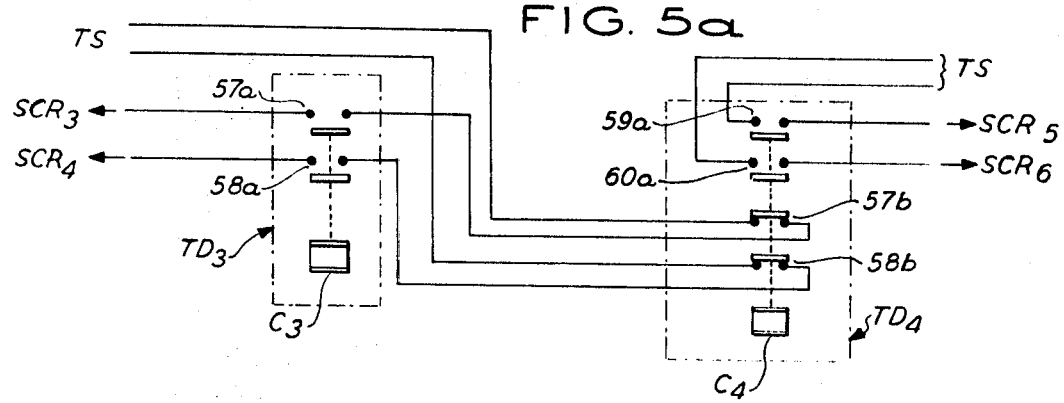

The section 51 is disconnected from the primary concurrently with triggering of $SCR_5$, $SCR_6$ by cutting off the biasing signals for $SCR_3$, $SCR_4$. This is readily done as schematically indicated in FIG. 5A by auxiliary contacts connected in series with the $TD_3$ contacts and interlocked with the $TD_4$ contacts.

Summarizing briefly, each time delay device $TD_3$ and $TD_4$ includes a time counter, motor, etc. generally represented at $C_3$ and $C_4$ respectively, for operating SCR trigger circuit contacts. The counters $C_3$ and $C_4$ can be of any electrical or electromechanical type suitable for starting by the sensor signal. The counter $C_3$ of $TD_3$ operates contacts 57a and 58a in the $SCR_3$ and $SCR_4$ trigger circuits respectively. These contacts are connected in series with corresponding auxiliary contacts 57b and 58f that are operated by counter $C_4$ of $TD_4$. The trigger contacts 59a and 60a for $SCR_5$ and $SCR_6$ are likewise operated by counter $C_4$ so that when these trigger contacts close, the auxiliary contacts 57f and 58f open to break the trigger circuits of $SCR_3$ and $SCR_4$. Thus, when $SCR_5$ and $SCR_6$ are triggered to connect the primary section 50 across the supply line 54, 56, the biasing signals on $SCR_3$ and $SCR_4$ are removed and they become nonconducting.

It will therefore be apparent that the present concept of pulse suppression for arc starting in a pulsed-spray system of arc welding is not limited to the specific circuitry and equipment disclosed herein, either for transformer primary of secondary switching control. Although SCR switching is preferred, high-speed relays for example, can be used if desired for achieving the pulse control switching.

Also, as the basic purpose of the sensor S is for detecting a manifestation of initial background arcing, sensing is not limited to detecting simply the arc current; accordingly, the sensor may take the form of various well-known devices for producing a signal that directly or indirectly indicates establishment of the arc. For example, where sensing is based on the arc current, electromagnetic means such as current transformers involving conventional relays and the like, can readily detect the arc current; also the magnetic field about a conductor carrying the arc current can be the detecting medium, using "Hall-effect" probes for example.

Where sensing of the actual arc is preferable, the desired manifestation signal can readily be produced by detectors of known acoustical or photoelectric types; also infrared or ultraviolet sensitive means can be used to detect the initial background arc.

Detailed descriptions of such sensing arrangements are unnecessary in view of the state of the art and are therefore omitted for simplicity of disclosure.

Although the present invention is represented as being especially useful in a pulsed-spray welding system wherein the background power level is below the transition level, and the peak pulsing power is above the transition level, it will be understood that the invention is not limited to specific background and pulsing power levels with respect to the transition level.

Having set forth the invention in what is considered to be the best embodiment thereof, it will be understood that changes may be made in the system and apparatus as above set forth without departing from the spirit of the invention or exceeding the scope thereof as defined in the following claims.

I claim:

1. In a pulsed power arc welding system having a welding circuit including arc electrodes, means for supplying background current to the circuit for sustaining a stable arc between the electrodes, and means for supplying also the circuit time-spaced current pulses with maximum values greater than the background current for achieving pulsed-spray arc welding, the method of starting the welding arc which comprises suppressing normal pulse current while applying background current to the welding circuit, sensing a manifestation of a starting background arc following initial contact of the electrodes, and thereafter applying normal pulse current to the welding circuit for continuous pulsed-spray arc welding.

2. A method of starting a welding arc as specified in claim 1 wherein normal current pulses following a sensed manifestation of background arcing, are suppressed for a time period representing the formation of a stable arc by the background current.

3. A method of starting the welding arc as specified in claim 1 wherein the manifestation of the starting arc is background current at an arc-sustaining level.

4. A method of starting the welding arc as specified in claim 1 wherein the pulse current initially is partly suppressed, and normal pulse current is applied to the welding circuit following arc manifestation sensing.

5. A method of starting the welding arc as specified in claim 2 wherein the pulse current is wholly suppressed initially and during the first part of the time period, and is partly suppressed during the latter part of the period, and normal pulse current is applied to the circuit at the end of the time period.

6. A method of starting the welding arc as specified in claim 2 wherein the duration of normal pulse current suppression following arc manifestation sensing is from 0.05 to 1.0 seconds.

7. In a pulsed current electric arc mig welding power supply having means for supplying power to a welding arc in pulses of current of sufficient magnitude to cause spray transfer separated by intervals of DC current of arc sustaining magnitude below the level necessary for spray transfer supplied from a background current means, the improvement comprising current sensing means corrected to sense the flow of current in the circuit to said arc and to develop an output in response thereto, pulse suppression means connected to said current pulse supply means and to said current sensing means, said suppression means operative to suppress current pulses and responsive to the output of said sensing means to cease suppressing current pulses after arc current from said background current means has been initiated.

8. A pulsed power arc welding system as specified in claim 7 wherein the means responsive to the sensing means includes time-delay means for controlling the duration of pulse suppression.

9. A pulsed power arc welding system as specified in claim 7 wherein the sensing means is responsive to background starting current in the welding circuit at a predetermined current level.

10. A pulsed power arc welding system as specified in claim 8 wherein the pulse suppression means includes switching means that is responsive to the time-delay means for controlling flow of pulse current to the welding circuit.

11. A pulsed power arc welding system as specified in claim 10 wherein the switching means comprises controlled rectifier means, and the time delay means apply triggering signals to the rectifier means after a period sufficient for the establishment of stable background arcing current.

12. A pulsed power arc welding system as specified in claim 10 wherein the switching means is maintained in nonconducting condition by the time-delay means for a predetermined time period following a sensed manifestation of the background starting arc.

13. A pulsed power arc welding system as specified in claim 10 wherein the controlled rectifier means in part, conducts reduced pulse current, and the time-delay means responds to the sensing means for selective suppression of the pulse current by sequential triggering of the controlled rectifier means.

14. A pulsed power arc welding system as specified in claim 11 wherein the controlled rectifier means is connected in branch circuits respectively, of a pulse-current supply system for selective supply of pulse current to the welding circuit at suppressed and normal pulse values respectively, and the means responsive to the sensing means controls application of triggering signals to the rectifiers of respective branches for selective flow of starting and normal pulse current to the welding circuit.

15. A pulsed power arc welding system as specified in claim 12 wherein the switching means is shunted by an impedance for limited conduction of pulse current at start and during the predetermined time delay.

16. A pulsed power arc welding system as specified in claim 12 wherein the switching means is initially in nonconducting condition and is connected in series in the welding circuit, and the time-delay means places the switching means in pulse conducting condition a predetermined time after response of the time-delay means to the sensing means.

UNITED STATES PATENT OFFICE
CERTIFICATE OF CORRECTION

Patent No. 3,588,466          Dated June 28, 1971

Inventor(s) Evans H. Daggett

It is certified that error appears in the above-identified patent and that said Letters Patent are hereby corrected as shown below:

Column 1, line 53, "THat" should be --That--
Column 2, line 38, insert the following:
    --Fig. 5 illustrates an alternative form using transformer primary circuit control for multiple-stage pulse suppression;--
Column 2, Line 39, "Fig. 5" should be --5A--
Column 2, Line 29, after "illustration" insert --of the--
Column 2, line 72, "ply" should be --supply--
Column 3, line 45, "bolts" should be --volts--
Column 4, line 45, "THE" should be --The--
Column 4, line 50, "off" should be --of--
Column 5, line 10, "aNd" should be --and--
Column 5, line 11, "cast" should be --case--
Column 5, line 24, "winding" should be --windings--
Column 6, line 49, "of" should be --or--
Column 7, Claim 1, line 14, after "also" insert --to--

Signed and sealed this 30th day of November 1971.

(SEAL)
Attest:

EDWARD M. FLETCHER, JR.          ROBERT GOTTSCHALK
Attesting Officer                Acting Commissioner of Patents